US011325487B2

(12) United States Patent
Djedovic et al.

(10) Patent No.: US 11,325,487 B2
(45) Date of Patent: May 10, 2022

(54) ELECTRIC CONNECTION DEVICE FOR ELECTRIC OR HYBRID MOTOR VEHICLES

(71) Applicant: Kiekert AG, Heiligenhaus (DE)

(72) Inventors: Benjamin Djedovic, Oberhausen (DE); Tim Sonnenschein, Wuppertal (DE); Winfried Schlabs, Bochum (DE); Claus Töpfer, Sindelfingen (DE)

(73) Assignee: Kiekert AG, Heiligenhaus (DE)

( * ) Notice: Subject to any disclaimer, the term of this patent is extended or adjusted under 35 U.S.C. 154(b) by 96 days.

(21) Appl. No.: 16/753,858

(22) PCT Filed: Sep. 19, 2018

(86) PCT No.: PCT/DE2018/100795
§ 371 (c)(1),
(2) Date: Sep. 6, 2020

(87) PCT Pub. No.: WO2019/068280
PCT Pub. Date: Apr. 11, 2019

(65) Prior Publication Data
US 2021/0008990 A1    Jan. 14, 2021

(30) Foreign Application Priority Data
Oct. 6, 2017   (DE) ..................... 10 2017 123 208.7

(51) Int. Cl.
F16H 19/02   (2006.01)
B60L 53/16   (2019.01)
(Continued)

(52) U.S. Cl.
CPC ............... B60L 53/16 (2019.02); B60L 53/37 (2019.02); H01R 13/639 (2013.01); H02J 7/0045 (2013.01)

(58) Field of Classification Search
CPC ....................... H01R 13/4361; B60L 11/1809
See application file for complete search history.

(56) References Cited

U.S. PATENT DOCUMENTS 5,676,560 A     10/1997  Endo
8,075,329 B1 *  12/2011  Janarthanam ...... H01R 13/6392
                                                    439/304
(Continued)

FOREIGN PATENT DOCUMENTS

CN    202695855 U    1/2013
CN    205882304 U    1/2017
(Continued)

OTHER PUBLICATIONS

Translation of International Search Report dated Jan. 25, 2019 for PCT/DE2018/100795.

Primary Examiner — Neil Abrams
(74) Attorney, Agent, or Firm — Renner, Otto, Boisselle & Sklar, LLP

(57) ABSTRACT

An electric connection device for electric or hybrid motor vehicles, said connection device being equipped with a charging plug socket, a charging plug, a movable locking element for releasably locking the charging plug in the charging plug socket, and a drive for moving the locking element, said drive having an electric motor and a multistage transmission for acting on the locking element. The multistage transmission has individual shafts, each of which is arranged parallel to the output shaft of the electric motor as part of the drive. The device may use gearing to actuate a sensor to determine how far one of the individual shafts has rotated. An emergency unlocking crank may be mounted to a separate shaft that is engageable with one of the individual shafts via a cam.

16 Claims, 3 Drawing Sheets

(51) Int. Cl.
*B60L 53/37* (2019.01)
*H01R 13/639* (2006.01)
*H02J 7/00* (2006.01)

(56) References Cited

U.S. PATENT DOCUMENTS

| | | | | |
|---|---|---|---|---|
| 8,172,599 | B2* | 5/2012 | Konchan | B60L 53/16 |
| | | | | 439/352 |
| 8,550,833 | B2* | 10/2013 | Martin | B60L 53/16 |
| | | | | 439/310 |
| 8,900,006 | B2* | 12/2014 | Gaul | B60L 53/65 |
| | | | | 439/489 |
| 8,936,482 | B2* | 1/2015 | Smith | B60L 53/16 |
| | | | | 439/347 |
| 8,951,060 | B2* | 2/2015 | Meyer-Ebeling | B60L 53/16 |
| | | | | 439/347 |
| 9,533,586 | B2* | 1/2017 | Kahara | B60L 53/16 |
| 10,173,537 | B2* | 1/2019 | Herzog | B60L 50/16 |
| 2013/0137286 | A1 | 5/2013 | Smith | |
| 2021/0010572 | A1* | 1/2021 | Djedovic | B60L 53/30 |
| 2021/0075160 | A1* | 3/2021 | Topfer | B60L 53/30 |

FOREIGN PATENT DOCUMENTS

| | | |
|---|---|---|
| DE | 19544942 A1 | 7/1996 |
| DE | 102010029446 A1 | 12/2011 |
| DE | 102014217696 A1 | 3/2016 |
| EP | 3203592 A2 | 8/2017 |
| WO | 2010/149426 A1 | 12/2010 |

* cited by examiner

ELECTRIC CONNECTION DEVICE FOR ELECTRIC OR HYBRID MOTOR VEHICLES

FIELD OF INVENTION

The invention relates to an electric connection device for electric or hybrid motor vehicles, said connection device comprising a charging plug socket and a charging plug, wherein the charging plug is releasably anchored in the charging plug socket using a movable locking element, and wherein a drive is provided which has a multistage transmission for acting on the locking element.

BACKGROUND OF INVENTION

Batteries of electric or hybrid motor vehicles require a regular supply of electrical energy. This is made possible through access to a charging infrastructure, which typically includes charging stations. To facilitate charging with electrical energy, the charging plug is generally coupled and releasably locked to a charging plug socket of the motor vehicle. The locking is needed in order to prevent health hazards since high voltage is generally in effect here.

Also, the locking ensures that for example a user, previously identified, correctly draws the electrical energy made available by the charging station, and that incorrect usage is prevented. In known solutions in this regard, such as that described in WO 2010/149426 A1, a communication link is set up using an identification signal in order to verify the authorization of the user and to ensure that the user also pays for the electrical energy withdrawn.

Different solutions are described in the prior art for driving the locking element. For example, DE 10 2014 2017 696 A1 discloses providing a compressed spring for pre-tensioning the locking element for this purpose.

The generic solution according to CN 2020695855 U relies on an electromechanical drive for the locking element to accomplish this. The electromechanical drive is made up of an electric motor and an output-side multistage transmission. The multistage transmission operates on the locking element by way of a cam.

In the known teaching, a rotary motion of the output shaft of the electric motor is conveyed to the transmission for this purpose in order to effectuate the action on the locking element using the cam. This is kinematically unfavorable in that high lateral forces can act on the locking element, for example when a force is applied to the charging plug when it is releasably locked in the charging plug socket. In this regard, more and more compact drives are being required here, and these drives must at the same time also provide a high output torque for acting on the locking element. The previous solutions are not capable of this.

SUMMARY OF INVENTION

The problem underlying the invention is to improve upon such an electrical connection device such that even large forces engaging the charging plug and acting on the locking element can be absorbed, while at the same time keeping the design of the drive compact.

To solve this technical problem, a generic electrical connection device for electric or hybrid motor vehicles in particular is characterized in the invention in that the multistage transmission comprises individual shafts, each of which is disposed parallel to the output shaft of an electric motor of the drive.

Thus, in the invention a special topological layout of the drive, and in particular of the multistage transmission is pursued. In fact, the drive, i.e. the electromechanical drive, does not make use of just the electric motor, but also a multistage transmission on which the motor acts on the output side. In the process, the transmission can be designed in three overall stages and in this regard this layout has proven to be particularly favorable.

Also, the layout is further advantageously configured such that the output shaft of the electric motor of the drive is disposed as a first shaft and a further second shaft is disposed for the most part superimposed relative thereto laterally. In this way, for practical purposes the combined length of the electric motor and the output shaft defines an extended length of an associated drive housing so as to accommodate the entire electromechanical drive. Furthermore, it is usually the case that in addition a third shaft is provided, as a consequence of which the multistage transmission is made of three stages, which is advantageous. Here, the layout is further such that the third shaft in question runs laterally superimposed relative to the second shaft and the electric motor. In this way, the combined length of the electric motor and the output shaft thereof defines the extended length of the drive housing. The lateral extension thereof is sized based on the parallel position of the output shaft of the electric motor, the second shaft and the third shaft relative to one another, respectively. In any case, in this way a compact overall layout of the drive, and a compact drive housing is provided.

Moreover, it has been shown to be especially advantageous for the multistage transmission to be equipped with a shaft on the output side which has at least two engagement means of different gearing. In the case that the multistage transmission is advantageously designed in three stages, the shaft on the output side is superimposed relative to the third shaft. As described already previously, the third shaft runs laterally superimposed relative to the second shaft and the electric motor.

Said third shaft is equipped with the at least two engagement means of different gearing. A first engagement means of the shaft on the output side is provided for coupling to a shaft on the input side. In the present case, this is usually the second shaft. The second engagement means on the shaft on the output side generally is provided for coupling to an emergency unlocking mechanism.

In general, the emergency unlocking mechanism has a manually-actuatable crank. The crank is provided on a separate shaft. The separate shaft of the emergency unlocking mechanism is in general disposed inside the drive housing laterally superimposed on the electric motor and with approximately the same extension as the second shaft.

Finally, the shaft on the output side, i.e. the third shaft, can also be equipped with a cam. In general, the cam interacts with the locking element as a third engagement means. In the process, the layout further includes the detail that the engagement means between the individual shafts are implemented as spur and/or helical gearing and/or evoloid gearing. Of course, other combinations are also possible.

An evoloid gearing in this regard has the advantage that especially high gear transmission ratios are possible as a result. This is important because the high torques desired for acting on the locking element are made available on the output side of the electric motor, and consequently of on the output side of the electromechanical drive, in this way.

Also, such an evoloid gearing helps to generate especially low transmission noises and a high efficiency. Finally, the reliance on such evoloid gearings allows especially compact transmission designs, which is very important in relation to the present invention. These are the substantial advantages.

BRIEF DESCRIPTION OF DRAWINGS

Below, the invention will be explained in more detail using the drawings which represent a preferred exemplary embodiment. Shown are.

DETAILED DESCRIPTION

An electrical connection device for electric or hybrid motor vehicles is shown in the figures. In the overview drawing according to FIG. 2A to 2C, a chassis 1 of the electric or hybrid motor vehicle in question is partially shown. Chassis 1 is equipped with a recess 2. In recess 2 there is a charging plug socket 3. Charging plug socket 3 can be coupled to a charging plug 4 electrically and in a releasably-locking manner, the charging plug being introduced into recess 2 in chassis 1 for this purpose and coupled to charging plug socket 3 in a releasably-locking manner.

Figure 1:
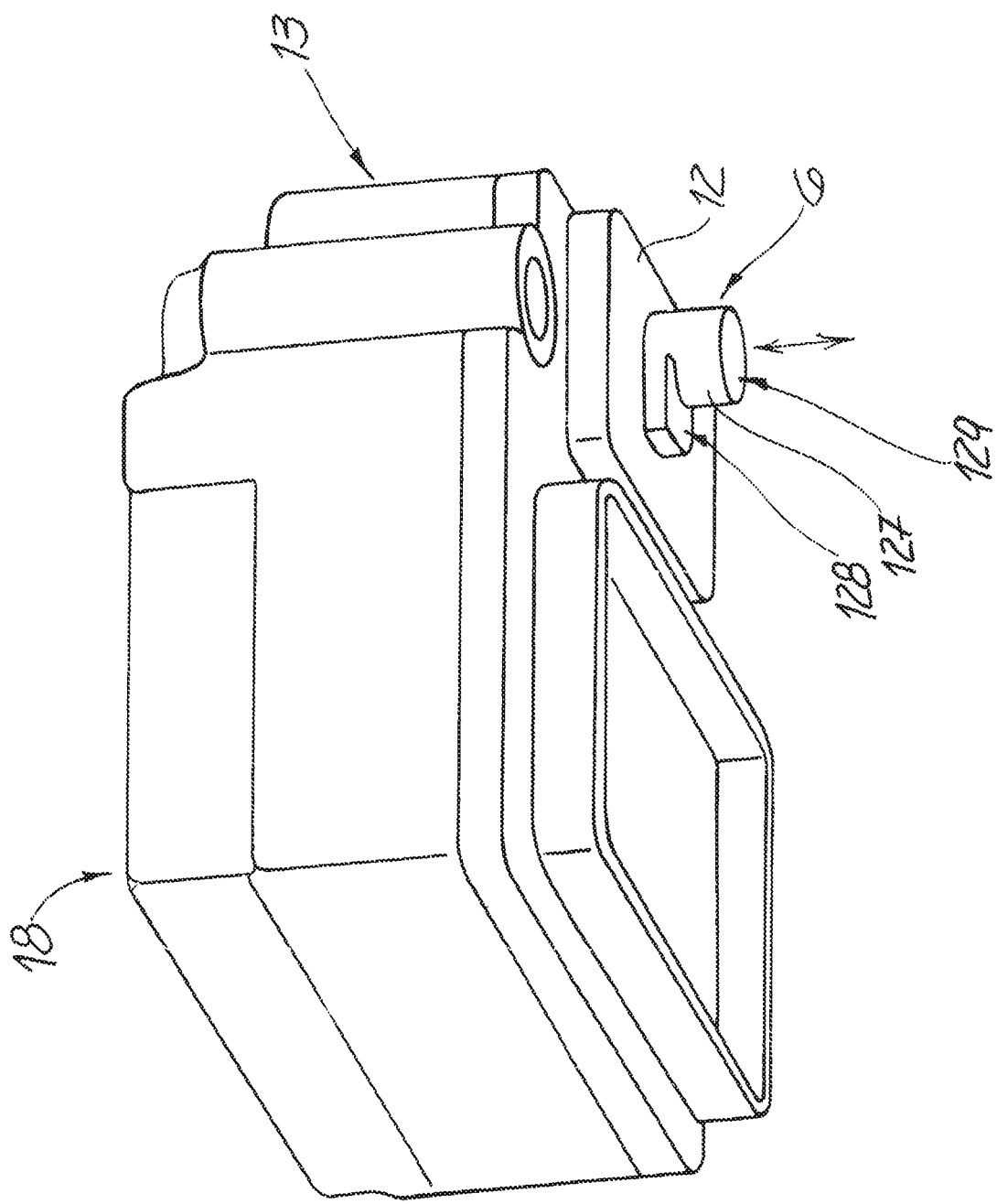
FIG. 1 the electrical connection device according to the invention in a top view, FIG. 2A to 2C the contacting between the charging plug socket and the charging plug in individual functional states in a sectional view and FIG. 3 a top view of the drive housing in the opened state.

To this end, charging plug 4 has plug contacts 5, which are only indicated in FIG. 1, which engage into associated receptacles 5' inside charging plug socket 3. Of course, the reverse procedure can be used. In this case, charging plug socket 3 is equipped with the plug contacts 5 which releasably engage into associated receptacles 5' of charging plug 4, which however is not shown.

In order to lock charging plug 4 to charging plug socket 3 releasably, a movable locking element is provided. The movable locking element 6 is a locking pin or a locking plunger in the exemplary embodiment, i.e. overall a cylindrical locking element 6, which is made of plastic. In alternative embodiments, locking element 6 can also be made of metal. To releasably lock charging plug 4 relative to charging plug socket 3, locking element 6 reaches into an associated cut-out 7 in charging plug 4. In addition, when in the locked state according to FIG. 2C, locking element 6 also reaches into another cut-out 7' in charging plug socket 3.

Figure 2:
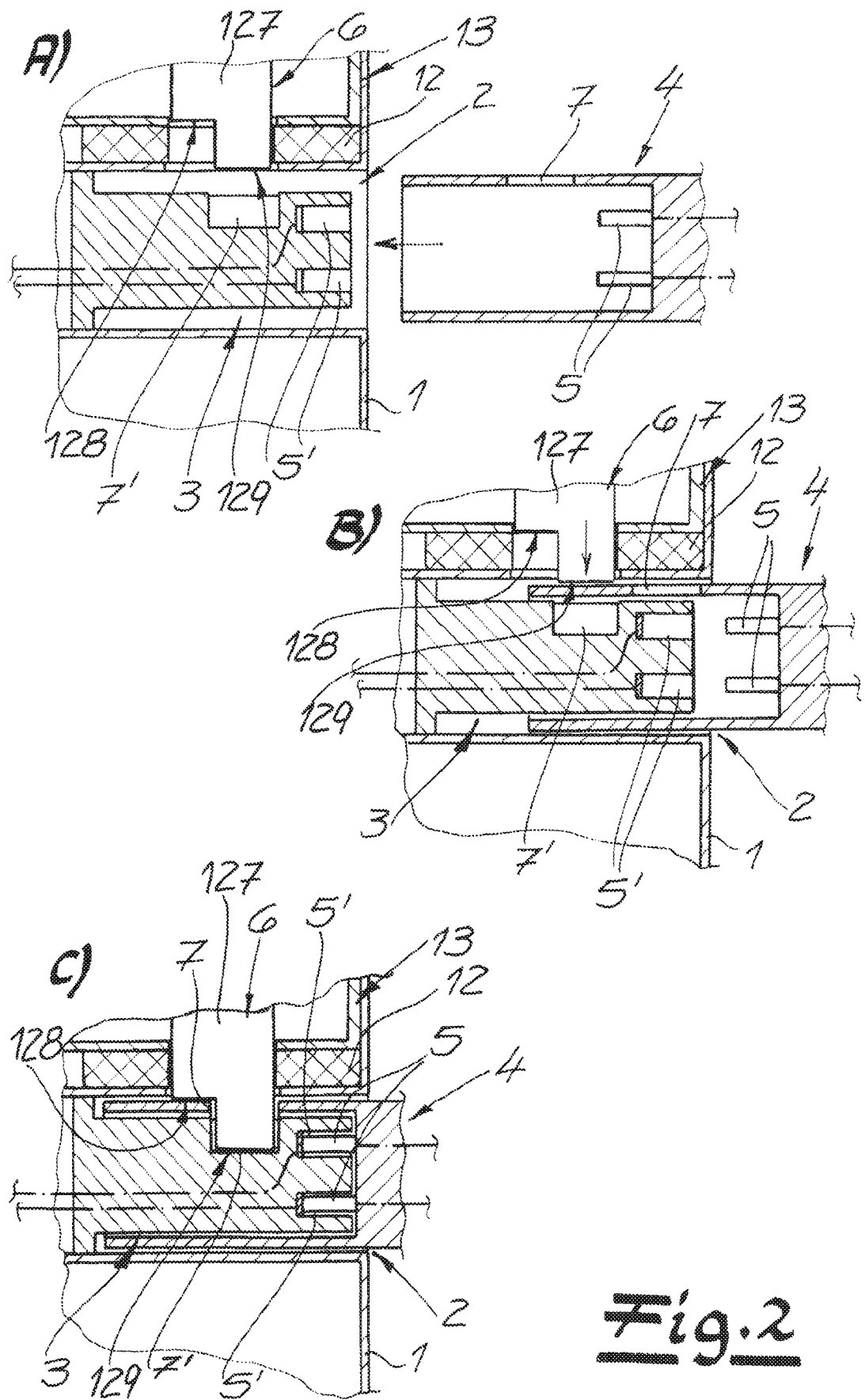

Locking element 6 can move relative to the two cut-outs 7, 7' in order to effectuate or release the locking between charging plug 4 and charging plug socket 3. The unlocked state corresponds to the representation according to FIG. 2A. On the other hand, FIG. 2B shows the process of locking, whereas FIG. 2C reflects the final locked state. Movements of locking element 6 in the longitudinal direction thereof as indicated by the double arrow in FIG. 1 correspond to these states. Control motions of locking element 6 are made by an electromechanical drive according to the exemplary embodiment. The longitudinal direction of locking element 6 runs perpendicular to a plane in which shafts 9, 10, and 11 of the drive are disposed.

The drive comprises an electric motor 8, a first shaft 9, a second shaft 10, a third shaft 11, and a locking lever 119 against which locking element 6 abuts. Locking lever 119 is set into motion using electric motor 8 and shafts 9-11, whereupon locking element 6 is moved. Locking lever 19 is moved perpendicular to a plane in which shafts 9-11 are disposed. In the exemplary embodiment, locking lever 119 and locking element 6 are designed together in one piece.

Locking element 6 has a staged configuration with a protrusion 127 so that locking element 6 has a first support surface 129 on protrusion 127 at a higher level and a second support surface 128 at a lower level. The relative indicators "higher level" and "lower level" refer to a distance relative to an end of locking element 6 on the housing side. The two support surfaces 128, 129 can be used to detect whether charging plug 4 has been introduced into charging plug socket 3 deeply enough. Utilization is made of this fact to the extent that in normal operation, in other words when charging plug 4 is introduced sufficiently deeply into charging plug socket 3, locking element 6 both reaches through cut-out 7 of charging plug 4 and reaches into cut-out 7' of the charging plug socket in order to achieve locking. The size and alignment of cut-out 7, 7' are selected such that in normal operation locking element 6 is passed through cut-out 7 in charging plug 4 and introduced into cut-out 7' of charging plug socket 3 by way of protrusion 127, while second support surface 128 comes to lie against a surface of charging plug 3, thereby stopping the movement of locking element 6. In addition, the length of time is monitored that electric motor 8 of the drive had been operated prior to the stopping of locking element 6, for example by monitoring a number of rotations of one of shafts 9-10 or by monitoring power consumption in electric motor 8. This can determine whether normal operation is in effect. If charging plug 3 is not inserted deeply enough, the first support surface 129 on protrusion 127 first comes to sit against charging plug 3 and locking element 6 is already stopped in advance. Also, a third situation can be determined, namely the case when charging plug 3 is broken and therefore secure locking is not ensured even when introduction is deep enough. In this case, locking element 6 can be inserted deeper than in normal operation.

The first shaft 9 of the electromechanical drive constitutes an output shaft of electric motor 8 and meshes with the second shaft 10 by way a gearing 122, which is preferred to be designed as an evoloid gearing. The second shaft 10 also has a gearing 123 by way of which the second shaft 10 meshes with the third shaft 11. The gearing 123 of the second shaft 10 can also be designed as an evoloid gearing. The evoloid gearing provides a high to very high gear transmission ratio of for example 1:30, 1:80, 1:140 or 1:320 where there are relatively compact space requirements.

In addition to a first gearing 124 which meshes with the gearing 123 of the second shaft, the third shaft 11 has a second gearing 125 which is disposed at an end of the third shaft 11 which is opposite to the first gearing 124. The second gearing 125 is used for driving a switch actuator 130 for actuating a sensor 16 designed as a microswitch. The actuation of the microswitch signifies a successful rotation of the third shaft 11. The microswitch thus determines how far the third shaft 11 has rotated and how long the drive was in operation.

The electromechanical drive is accommodated in a dedicated drive housing 13 and is housed in its entirety by the drive housing 13 so that the drive can be placed and installed inside the chassis 1 at a suitable location in modular fashion and independent of charging plug socket 3. A seal 12 in the area of locking element 6 provided on the outside at drive housing 13 provides that locking element 6 can move back and forth while being sealed relative to drive housing 13. Since, moreover, locking element 6 is mounted in drive housing 13, this provides overall a ready-to-install assembly or installation module. Of course, solutions which fall under the invention also include those in which the drive and charging plug socket 3 are accommodated in a common housing, a solution which, however, is not shown.

With the aid of the drive, locking element 6 travels relative to a guide 14, 15. According to the exemplary embodiment, guide 14, 15 is designed in two parts and is made up on one hand essentially of a fixed housing guide 14 in drive housing 13 and on the other hand as a moving support 15, as respective guide components 14, 15.

The drive transmission is multi-staged overall, comprising three transmission stages. According to the invention, the associated shafts 9, 10, and 11 according to the exemplary embodiment are each disposed parallel to the output shaft 9 of electric motor 8 of the drive. Also, shafts 9, 10, and 11 and associated gears are made entirely of plastic, but not limited thereto. The same applies to drive housing 13.

Figure 3:
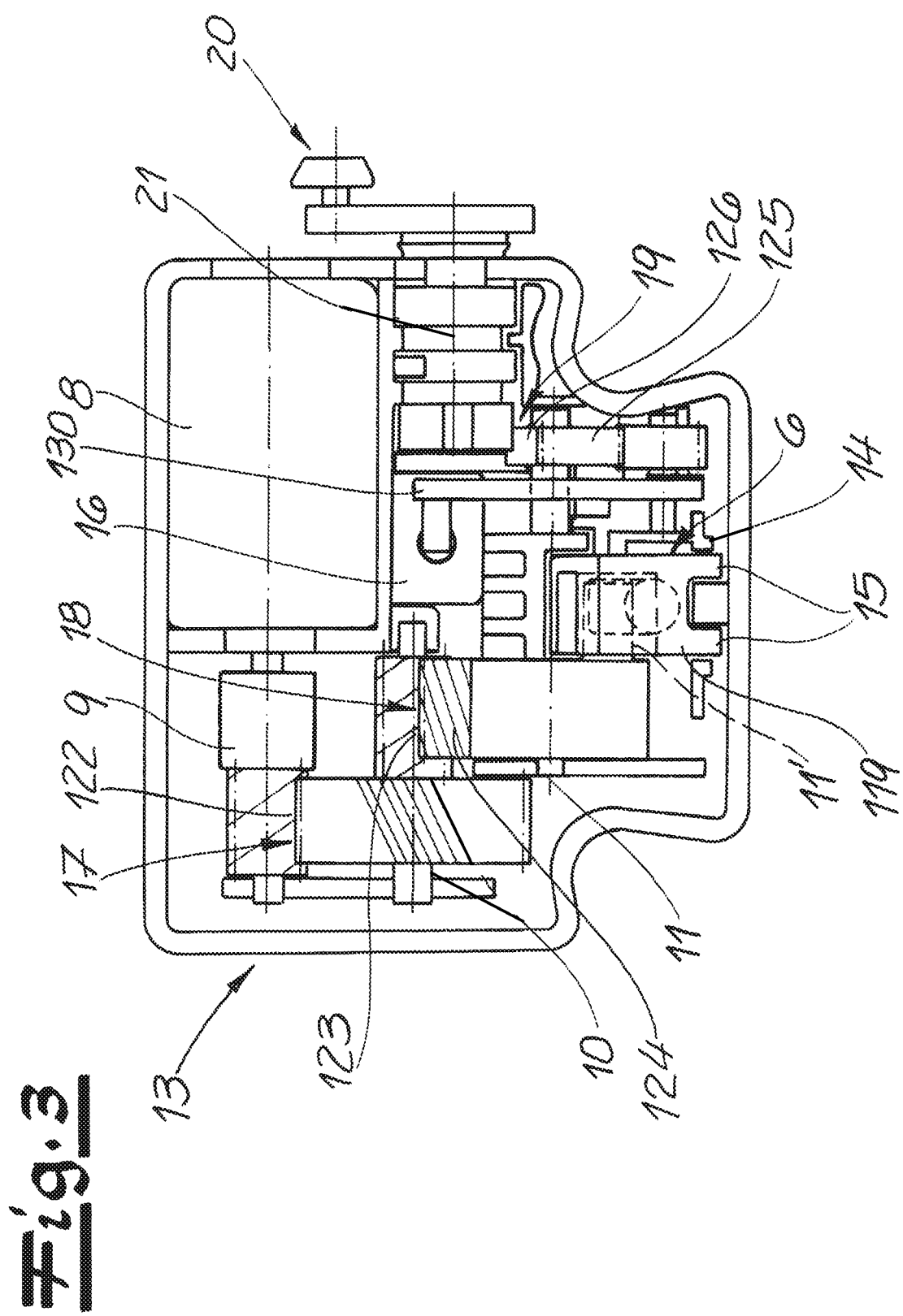

In fact, the design shown in FIG. 3 is such that the output shaft of electric motor 8 of the drive—as the first shaft 9—and the second shaft 10 are for the most part laterally superimposed relative to one another. The second shaft 10 has a similar longitudinal extension as the first shaft 9 and both shafts 9, 10 largely superimpose onto one another laterally so that the end effect is that there is no lateral overhang. Moreover, the third shaft 11 is disposed inside of drive housing 13 and runs laterally superimposed relative to the second shaft 10 and to electric motor 8. Of course, the third shaft 11 is also disposed parallel to the second shaft 10, which in turn is disposed parallel to the first shaft 9.

This special characteristic, with parallel shafts 9, 10, 11 and the lateral superimposing thereof allows the drive housing 13 to be constructed very compactly overall, thereby providing a small drive unit design. This is because the combined length of electric motor 8 and the first shaft 9 specifies the longitudinal extent of drive housing 13. The lateral arrangement with superimposing of the second and third shafts 10, 11 then essentially defines the lateral extent of drive housing 13. A cam 11' in the shape of a bend in the third shaft, i.e. shaft 11 on the output side, must also be included here.

Moreover, as a result of the compact design of drive housing 13, there is space for a sensor 16 inside for scanning the position of locking element 6 using the position of the transmission, and for transmitting this position to a remote-control unit. Sensor 16 is designed as a microswitch which is actuated via the switch actuator 130. Using the cam, or bend 11', locking element 6 is acted upon in the longitudinal direction thereof using drive 8 to 11, as has been described above.

The shaft on the output side, i.e. shaft 11, has at least two engagement means 18, 19. In addition, there is another engagement means 17 implemented between the first shaft 9 and the second shaft 10. In the exemplary embodiment, engagement means 19 is a cam or two interacting cams.

In the exemplary embodiment, engagement means 17 on the input side is designed as but not limited to an evoloid gearing implemented on the output, or first, shaft 9. The evoloid gearing or engagement means 17 meshes in this case with a beveled gearing of the second shaft 10 and in this way provides a transmission ratio of at least 5, in particular even 10, for example. The second engagement means 18 also reaches back to an evoloid gearing located on the output side of second shaft 10 which comprises the input beveled gearing. In this regard, the evoloid gearing meshes with a bevel gearing on the third shaft, whereby a transmission ratio of at least 5 and preferably 10 can again be provided or implemented.

In the exemplary embodiment, the second engagement means 19 of shaft 11 is the cam already discussed above, or two cams, one of which is disposed on the third shaft 11 and another of which is disposed on another additional separate shaft 21 of an emergency unlocking mechanism comprising a crank 20. The emergency unlocking mechanism or crank is equipped with this separate shaft 21. Separate shaft 21 of the emergency unlocking mechanism runs lateral superimposed relative to electric motor 8 and has approximately the same extension as the second shaft 10, as can be seen in particular in the representation in FIG. 3.

The second engagement means 19 on the shaft on the output side, i.e. the third shaft 11, is the cam already discussed which interacts with or can interact with a cam on separate shaft 21. In the process, rotating actions of crank 20 result in the separate shaft 21 also being set into rotary motion and these rotations being transferred to the third shaft 11 by way of engagement means 19. This allows crank 20 to unlock the locking element alternatively, namely on an emergency basis, in the event of failure of electric motor 8. Crank 20 is disposed in the vehicle such that it can be accessed and actuated by a user for purposes of emergency unlocking, wherein the placement in the vehicle can be such that a part such as a lid, for example, must be opened first in order to gain access to crank 20.

The invention claimed is:

1. An electric connection device for electric or hybrid motor vehicles, the electric connection device comprising:
    a charging plug socket,
    a charging plug,
    a locking element for releasably locking the charging plug in the charging plug socket,
    a drive for moving the locking element, the drive having an electric motor and a multistage transmission for acting on the locking element, wherein the multistage transmission has individual shafts, each of which is arranged parallel to an output shaft of the electric motor of the drive, and
    an emergency unlocking mechanism including a manually-actuatable crank having a separate shaft arranged parallel to the output shaft of the electric motor,
    wherein the individual shafts of the multistage transmission include a second shaft that meshes with the output shaft via a gearing of the second shaft, and a third shaft that meshes with the second shaft via a gearing of the third shaft,
    wherein the separate shaft is configured to transfer rotation of the manually-actuatable crank to the third shaft.

2. The electric connection device according to claim 1, wherein the output shaft of the electric motor of the drive, and at least one of the individual shafts are disposed laterally superimposed relative to one another in a direction that is perpendicular to the output shaft of the electric motor.

3. The electric connection device according to claim 1, wherein the second shaft is downstream the output shaft of the electric motor, and the third shaft is downstream relative to the second shaft.

4. The electric connection device according to claim 1, wherein the separate shaft of the emergency unlocking mechanism runs laterally superimposed relative to the electric motor in a direction that is perpendicular to an axis of the electric motor.

5. The electric connection device according to claim 1, wherein the third shaft comprises another cam which interacts with a locking element.

6. The electric connection device according to claim 3, wherein at least one of the gearing of the second shaft or the gearing of the third shaft includes a spur gearing, a bevel gearing, or an Evoloid gearing.

7. The electric connection device according to claim 3, wherein the third shaft extends laterally superimposed relative to the second shaft and the electric motor in a direction that is perpendicular to the output shaft of the electric motor.

8. The electric connection device according to claim 3 further comprising an other gearing between the output shaft and the second shaft, wherein the other gearing is an Evoloid gearing.

9. The electric connection device according to claim 3 further comprising a sensor, wherein the third shaft has another gearing that drives a switch actuator for actuating the sensor.

10. The electric connection device according to claim 3, wherein the output shaft and the second shaft are laterally superimposed relative to each other in a direction that is perpendicular to the output shaft of the electric motor.

11. The electric connection device according to claim 1, wherein the separate shaft of the emergency unlocking mechanism has a same length as the second shaft.

12. The electric connection device according to claim 1 further comprising a common drive housing, wherein the output shaft of the electric drive, the second shaft, the third shaft, and the separate shaft are accommodated in the common drive housing.

13. The electric connection device according to claim 1 further comprising a common drive housing, wherein the output shaft of the electric drive, and all of the individual shafts are accommodated in the common drive housing.

14. The electric connection device according to claim 13, wherein the common drive housing, the output shaft of the electric drive, and all of the individual shafts are formed of plastic.

15. The electric connection device according to claim 13 further comprising a guide for the locking element, wherein the guide includes a fixed housing guide that is fixed to the common drive housing, and a moving support.

16. The electric connection device according to claim 1, wherein the third shaft has a cam mounted on the third shaft opposite the gearing of the third shaft, and wherein the cam of the third shaft is engageable with a cam arranged on the separate shaft of the manually-actuatable crank.

* * * * *